United States Patent
Marcellin et al.

(10) Patent No.: US 10,015,412 B2
(45) Date of Patent: Jul. 3, 2018

(54) VIDEO CAPTURING SYSTEM AND METHOD FOR IMAGING CYCLICALLY MOVING OBJECTS

(71) Applicant: The Trustees for the Time Being of JUNIOR BARNES FAMILY TRUST, Sandton, Gauteng (ZA)

(72) Inventors: Paul Marcellin, Gauteng (ZA); Matthew Mullholland, Houtbay (ZA)

(73) Assignee: The Trustees for the Time Being of Junior Barnes Family Trust, Gauteng (ZA)

( * ) Notice: Subject to any disclaimer, the term of this patent is extended or adjusted under 35 U.S.C. 154(b) by 0 days.

(21) Appl. No.: 15/257,508

(22) Filed: Sep. 6, 2016

(65) Prior Publication Data
US 2018/0070024 A1    Mar. 8, 2018

(51) Int. Cl.
*H04N 5/262*    (2006.01)
*H04N 5/225*    (2006.01)
*H04N 5/235*    (2006.01)

(52) U.S. Cl.
CPC ......... *H04N 5/2627* (2013.01); *H04N 5/2256* (2013.01); *H04N 5/2354* (2013.01); *H04N 5/2254* (2013.01)

(58) Field of Classification Search
CPC .................................................. H04N 5/2627
See application file for complete search history.

(56) References Cited

U.S. PATENT DOCUMENTS 2,745,092 A    5/1956    Moorhead, Jr. et al.
6,244,971 B1 *  6/2001   Mihran .............. A63B 24/0021
                                                       473/200

(Continued)

FOREIGN PATENT DOCUMENTS

CA    2455114 A1    7/2005
CN    1554926 A    12/2004
(Continued)

OTHER PUBLICATIONS

Jonathan Valvano: "C14 5 Wagon wheel effect", YouTube, Dec. 21, 2013 (Dec. 21, 2013), pp. 1-1, Retrieved from the Internet: URL:https://www.youtube.com/watch?v=VNftf5qlpiA [retrieved on Jul. 22, 2016].
Mittechtv: "Blossoms—The Stroboscopic Effect", YouTube, Feb. 25, 2010 (Feb. 25, 2010), pp. 1-1, Retrieved from the Internet: URL:https://www.youtube.com/watch?v=QgRwDebcNbk [retrieved on Jul. 22, 2016].
Search Report for European Patent Application No. 16158336.4.
(Continued)

*Primary Examiner* — Cynthia Segura
(74) *Attorney, Agent, or Firm* — Neal, Gerber & Eisenberg LLP

(57) ABSTRACT

An image capturing system introduces or controls an aliasing/stroboscopic effect in a cyclically moving object. The system has a camera to capture a series of images to form a video of the cyclically moving object. A sensor detects the cycling frequency of the cyclically moving object and generates a frequency reading with a control module communicably coupled to the sensor. Retro-reflective indicia are provided on the cyclically moving object. A light emitter is aligned with the camera and is operable to emit pulses of light at a controllable emission frequency, such that pulses of light which reach the retro-reflective indicia are reflected backwards towards the camera, wherein the control module is configured to control the emission frequency of the light emitter based on the frequency reading, thereby to influence the temporal aliasing of the retro-reflective indicia provided on the cyclically moving object.

15 Claims, 3 Drawing Sheets

(56) References Cited

U.S. PATENT DOCUMENTS

| | | | |
|---|---|---|---|
| 8,884,812 B2* | 11/2014 | Nagy | G01S 7/415 |
| | | | 342/175 |
| 9,119,266 B1 | 8/2015 | Lebens et al. | |
| 9,622,326 B1* | 4/2017 | Devyver | H05B 37/0227 |
| 2003/0215005 A1* | 11/2003 | Kontola | G01S 19/21 |
| | | | 375/149 |
| 2004/0175913 A1* | 9/2004 | Johnson | H01J 37/32935 |
| | | | 438/610 |
| 2006/0038988 A1* | 2/2006 | Thermos | G01N 21/954 |
| | | | 356/241.1 |
| 2007/0112259 A1* | 5/2007 | Tateda | A61B 5/02007 |
| | | | 600/310 |
| 2012/0296185 A1* | 11/2012 | Sagan | A61B 5/14551 |
| | | | 600/336 |
| 2013/0095861 A1* | 4/2013 | Li | G01S 5/0263 |
| | | | 455/456.6 |
| 2014/0009312 A1* | 1/2014 | Nagy | G08G 1/052 |
| | | | 340/936 |
| 2014/0218227 A1* | 8/2014 | Stelzen | G01S 7/415 |
| | | | 342/104 |
| 2015/0228066 A1* | 8/2015 | Farb | G06K 9/00805 |
| | | | 348/148 |
| 2015/0253428 A1* | 9/2015 | Holz | G01S 17/42 |
| | | | 356/5.01 |
| 2016/0162747 A1* | 6/2016 | Singh | G06K 9/3241 |
| | | | 348/148 |
| 2016/0259038 A1* | 9/2016 | Retterath | G01S 7/4802 |
| 2017/0155852 A1* | 6/2017 | von Cramon | H04N 5/332 |
| 2017/0257542 A1* | 9/2017 | Takayama | H04N 5/2256 |

FOREIGN PATENT DOCUMENTS

| | | | |
|---|---|---|---|
| WO | 2009133403 A2 | 11/2009 | |
| WO | 2009133403 A3 | 1/2010 | |

OTHER PUBLICATIONS

"Nyquist sampling theorem: understanding the illusion of a spinningwheel captured with a video camera", Physics Education, Institute of Physics Publishing, Bristol, GB, vol. 49, No. 6, Oct. 28, 2014 (Oct. 28, 2014), pp. 697-705, ISSN: 0031-9120 [retrieved on Oct. 28, 2014].

* cited by examiner

VIDEO CAPTURING SYSTEM AND METHOD FOR IMAGING CYCLICALLY MOVING OBJECTS

FIELD OF INVENTION

This invention relates broadly to video capture of cyclically moving objects and it relates specifically to an image capturing system and method for imaging cyclically moving objects (e.g., rotating wheels) to achieve a specific or influenced temporal aliasing effect.

BACKGROUND OF INVENTION

The Applicant are familiar with the concept of aliasing in signal processing (http://en.wikipedia.org/wiki/Aliasing, accessed 18 Feb. 2015). Aliasing in the form of temporal aliasing is practically observable when a video camera operating at a particular sampling rate captures a cyclically moving object and the video of the subject shows the object moving at a false speed. This is colloquially known as the wagon-wheel effect (http://en.wikipedia.org/wiki/Wagon-wheel_effect, access 18 February 2015) and more scientifically as the stroboscopic effect (http://en.wikipedia.org/wiki/Stroboscopic_effect, accessed 18 Feb. 2015).

It is specifically this temporal aliasing effect which the Inventors wish to utilise to control display of a cyclically moving object in a video. However, this is difficult because there are two main factors which influence temporal aliasing, namely i) sampling rate of the camera and ii) frequency of the cyclically moving object, are not practically controllable.

Video cameras typically sample at industry-defined sampling rates or frequencies. Video footage intended for television display is usually provided at 24 or 30 FPS (Frames Per Second) or newer HFR (High Frame Rate) at 60 FPS. Some video cameras have adjustable sampling rates, while others have fixed sampling rates. Even if a video camera has an adjustable sampling rate, it might not be possible to adjust it in real-time, or if it is, it may be undesirable to have video captured at continuously varying sampling rates.

Controlling the frequency of the cyclically moving object is even more impracticable. The object may be a wheel of a car or bike, or a rotor of a plane or helicopter (for example). These objects usually cycle or rotate at frequencies dictated by an operation (e.g., speed) of the vehicle to which they are mounted. Fixing the operation of the vehicle to match the frequency of the cyclically moving object to the sampling rate of the camera is highly impractical.

Accordingly, the Inventors desire a system and method which permits control of the temporal aliasing of video captured of a cyclically moving object without needing to adjust the sampling rate of the video camera or the frequency of the cyclically moving object.

The closest disclosures of which the Applicant is aware are as follows:

CA2455114 discloses placement of a rotary mask over a rotating objected, the speed of the rotating mask being controllable (in one embodiment) by an external controller.

U.S. Pat. No. 2,745,092 discloses a method of illuminating indicia on a wheel. A strobe light is matched to a period of rotation of the wheel to display a particular number.

U.S. Pat. No. 9,119,266 discloses a handheld strobe light but the frequency of the strobe is not matched to an externally cyclical object.

WO2009133403 discloses downsampling a high framerate could intentionally introduce temporal aliasing effects such as the wagon wheel effect.

CN1554926 discloses projecting a grid pattern onto a cyclically moving object in order to measure deformation characteristics of the cyclically moving object by rendering a three-dimensional model of the object.

SUMMARY OF INVENTION

Accordingly, the invention provides an image capturing system which comprises a camera having a sampling frequency and being operable to capture a series of images to form a video of a cyclically moving object which cycles at a cycling frequency, the sampling and cycling frequencies not necessarily being related, wherein the image capturing system comprises:

a sensor operable to detect the cycling frequency of the cyclically moving object and to generate a frequency reading indicative of the detected cycling frequency;

a control module communicably coupled to the sensor and operable to receive from the sensor the frequency reading;

retro-reflective indicia provided on the cyclically moving object; and a light emitter which is aligned with the camera and is operable to emit pulses of light at a controllable emission frequency, such that pulses of light which reach the retro-reflective indicia are reflected backwards towards the camera which is operable to capture a composite image comprising the retro-reflective indicia illuminated by the light emitter and any other matter illuminated by ambient light other than from the light emitter, wherein the light emitter is communicatively coupled to the control module which is configured to control the emission frequency of the light emitter based on the frequency reading, thereby to influence the temporal aliasing of the retro-reflective indicia provided on the cyclically moving object as captured in the video.

The control module may be operable to calculate the emission frequency. The control module may be operable to generate a control signal indicative of the calculated emission frequency. The control module may be operable to direct the operation of the light emitter by means of the control signal.

The image capturing system may include a memory module communicatively coupled to, or integrated with, the control module and having stored thereon frequency criteria indicative of how the emission frequency is calculated. The memory module may have stored thereon the sampling frequency of the camera.

The control module, in accordance with the frequency criteria, may be operable to match the emission frequency with the cycling frequency. The control module, in accordance with the frequency criteria, may be operable to control the emission frequency such that it is not matched to, but is a function of, the cycling frequency. For example, the emission frequency may be a multiple, harmonic, or overtone of the cycling frequency.

The control module, in accordance with the frequency criteria, may be operable to control the emission frequency such that it is a function of both the cycling frequency and the sampling frequency.

The frequency criteria may dictate that the emission frequency is close to, but not the same as, the sampling frequency. This may create controlled aliasing in the form of a visually observable stroboscopic effect of the cyclically moving object in the video.

Instead, or in addition, the control module may be operable to receive a user input indicative of a desired operational state, e.g., increase stroboscopic effect, decrease stroboscopic effect, increase emission frequency, decrease emission frequency, etc. The image capturing system may include an input arrangement, e.g., a touchscreen, a slider, or a dial, operable to receive the user input.

The sensor may be discreet from the camera, e.g., being an external device. The sensor may be integral with the camera, e.g., including components associated with the camera sensor.

The sensor may be an EM (Electro Magnetic) transceiver, e.g., a laser/LIDAR or radar. The sensor may resemble a speed gun, e.g., those used in traffic enforcement, optionally with suitable modifications. Instead of measuring the speed of the cyclically moving object directly, the image capturing system may be configured to measure a linear speed of a vehicle carrying the cyclically moving object and then calculate a rotational speed of the cyclically moving object based on the speed of the vehicle. This may still be defined as detecting the speed of the cyclically moving object for the purposes of this specification.

The sensor may employ an external telemetry or timing signal, e.g., being GPS (Global Positioning System) based. For example, using a GPS reading from the sensor, the control module may be operable to calculate a speed of a vehicle carrying the cyclically moving object. If the cyclically moving object is a wheel, the control mobile may calculate the cycling frequency as a function of the speed of the vehicle and a diameter of the wheel.

By the light emitter "aligned" with the camera may mean that an angle $\alpha$ formed between the light emitter and the camera with the indicia being the vertex is small. The angle $\alpha$ may be less than 5° and may be less than 1°. Ideally (although probably not practicably) the camera and the light emitter would be co-axial such that the angle $\alpha$ would be 0°. To this end, the closer the light emitter is provided to the camera lens, the smaller the angle $\alpha$ and the more light reflected from the retro-reflective indicia the camera would receive. An acceptable angle $\alpha$ also depends on the specifications of the retro-reflective material used for the indicia. The light emitter may be arranged as close to the camera as practically possible.

The light emitter may be discreet from, or integrated with, the camera. The light emitter may be a lens ring light which is mounted or mountable around a lens of the camera around a longitudinal axis of the camera lens.

A simple example of retro-reflective indicia may be reflective tape on a rotary wheel.

The retro-reflective indicia on the cyclically moving object in the video may be temporally aliased to display an image or message. The image may not be visible to the naked eye when viewing the cyclically moving object directly, but may only become visible when viewed in the video of the cyclically moving object. The retro-reflective indicia may be configured to provide a moving image or animation (e.g., a running man) which may be realised using stop-motion or flipbook-like configuration and depending on suitable programming of the controller.

The image may contain any information practically attachable to the cyclically moving object. The image may include technical information, artistic representations, or advertising/promotional material.

The communicative coupling between the various components may be wired or wireless and may employ known communication techniques.

The control module may be embodied by a computer processor. It is to be understood that the computer processor may be one or more microprocessors, controllers, Digital Signal Processors (DSPs), or any other suitable computing device, resource, hardware, software, or embedded logic.

By way of theoretical explanation, the Inventors note that temporal aliasing (which is an existing phenomenon) occurs because of the relationship of two frequencies (the camera refresh and the target rotation speed). The present disclose proposes to take control of the phenomenon by introducing a third frequency (that of the pulsed light) and the reflective medium to capture the specific image required.

The invention extends to a method of imaging cyclically moving objects, the method comprising:
 detecting, by a sensor, a cycling frequency of a cyclically moving object and generating, by the sensor, a frequency reading indicative of the detected cycling frequency;
 communicating the frequency reading to a control module which is communicatively coupled to the sensor;
 operating a light emitter to emit pulses of light at a controllable emission frequency and at least in a direction which is aligned with a camera, the light emitter being communicatively coupled to the control module which is operable to control the emission frequency of the light emitter based on the frequency reading;
 directing the light emitter towards retro-reflective indicia provided on the cyclically moving object, such that pulses of light which reach the retro-reflective indicia are reflected backwards towards the camera; and
 capturing, by the camera having a sampling frequency, a series of composite images to form a video of the cyclically moving object, wherein the composite images comprise the retro-reflective indicia illuminated by the light emitter and any other objects illuminated by ambient light other than from the light emitter, thereby to influence the temporal aliasing of the retro-reflective indicia provided on the cyclically moving object as captured in the video.

The method may include calculating, by the control module, the emission frequency to produce a desired temporal aliasing effect. The temporal aliasing effect may be a stroboscopic effect. Calculating the emission frequency may be done by the control module in accordance with frequency criteria stored on a memory module communicatively coupled to the control module. The frequency criteria may be based on the cycling frequency and/or the sampling frequency.

The method may be implemented by the system as defined above.

The method may include receiving a user input indicative of frequency criteria. The user input may be received via an input arrangement.

The method may include applying the retro-reflective indicia to the cyclically moving object. The indicia may actually be considered as the cyclically moving object.

The method may be implemented repetitively and continually, that is, continually detecting the cycling frequency and adjusting the emission frequency accordingly. The method may be implemented in real-time.

The invention extends to a non-transitory computer-readable medium having stored thereon a computer program which, when executed by a computer processor, causes the processor to perform the method as defined above.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

Figure 1:
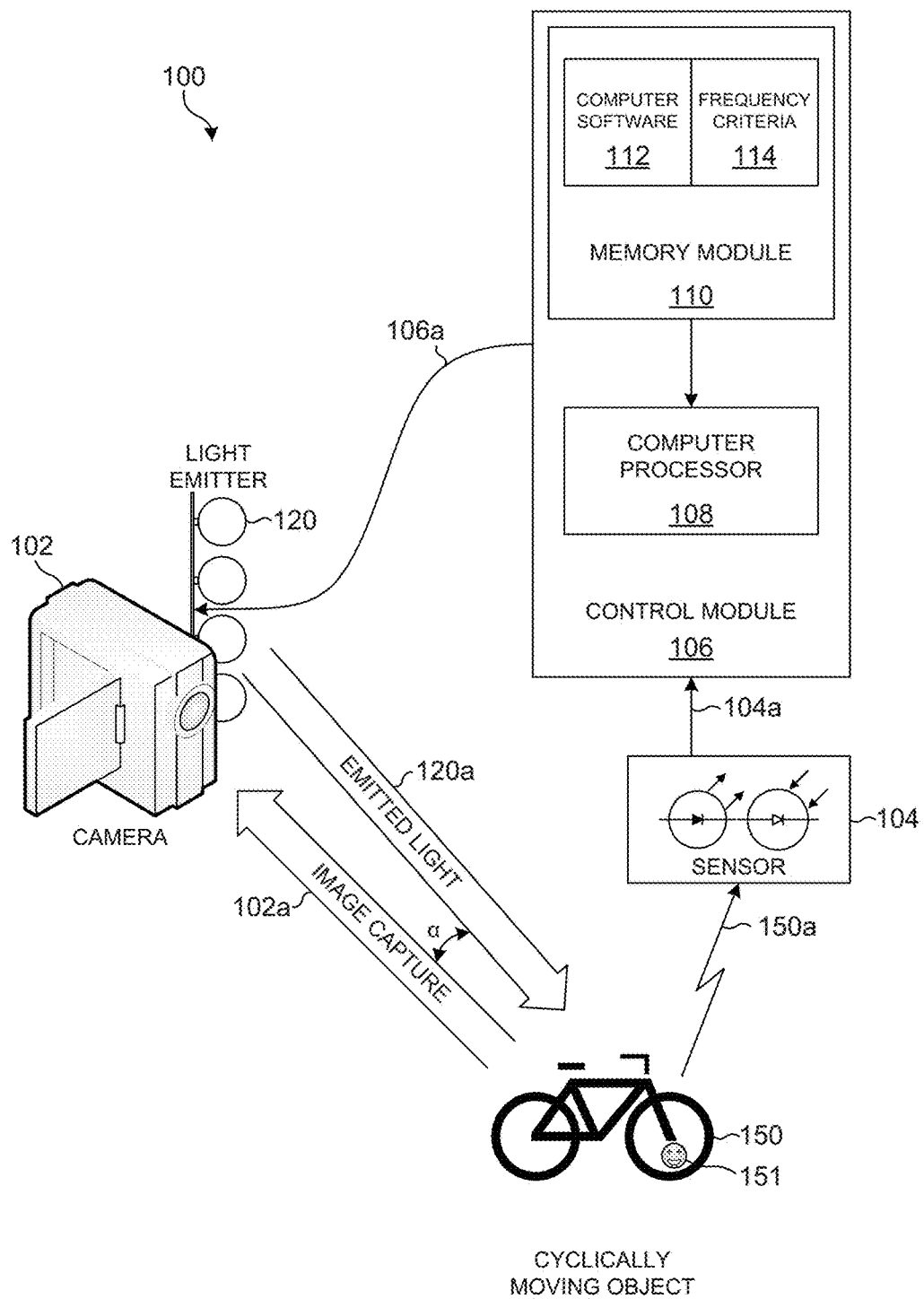
FIG. 1 shows a schematic view of an image capturing system, in accordance with the invention.

FIG. 1 shows an example image capturing system 100, in accordance with the invention. The system 100 includes a video camera 102. The video camera 102 may be a conventional or prior art video camera and needs no specific technical modification to operate in accordance with the invention. The video camera 102 is operable, in conventional fashion, to capture a series of images at a defined or definable sampling frequency 102a. The sampling frequency 102a may, for example, be 24 FPS or 50 FPS. The sampling frequency 102a is typically fixed (although may be configurable in some models of video cameras).

The video camera 102 is directed towards a cyclically moving object 150 which has provided thereon retro-reflective indicia 151. In this example, the cyclically moving object 150 is a bicycle, or more specifically, a bicycle wheel, but it will be understood that the cyclically moving object 150 may be any object which cycles or reciprocates, whether rotationally, linearly, or other. The bicycle wheel 150 has a cycling frequency 150a which typically is dynamic and thus can vary in accordance with the state of the bicycle, and more specifically, the speed of the bicycle. The cycling frequency 150a may vary continuously and in real-time.

A sensor 104 is directed towards the cyclically moving object 150, that is, the bicycle wheel 150. The sensor 104 may be technically very similar to a handheld speed gun which could be laser/LIDAR- or radar-based. The sensor 104 may be static (e.g., tripod-mounted), handheld, or automatically controllable (e.g., with electrical motors to adjust its directionality). Regardless of the specific technical configuration of the sensor 104, it is operable to detect the cycling frequency 150a of the bicycle wheel 150. In a different implementation, the sensor 140 may be operable to detect a speed of the bicycle from which the cycling frequency 150a of the bicycle wheel 150 can be calculated.

The cycling frequency 150a may be in cycles per second or Hz. The sensor 104 is operable to generate a frequency reading 104a indicative of the detected cycling frequency 150a. In this example, the sensor 104 is a discrete component, but in another example, it could be integrated with another component, e.g., the video camera 102.

The image capturing system 100 has a control module 106 to direct the operation of the image capturing system 100. The control module 106 is in the form of a suitably programmed computer processor 108 and may be housed in a portable computer, tablet, or some other computing device. The control module 106 includes a computer-readable medium in the form of a memory module 110 communicatively coupled to the computer processor 108. The memory module 110 has stored thereon computer software 112 which, when executed, directs the operation of the computer processor 108. Also stored on the memory module 110 are frequency criteria 114.

The image capturing system 100 has a light emitter 120 which is communicatively coupled to the control module 106. The control module 106 is operable to direct the operation of the light emitter 120 by means of a control signal 106a in accordance with the frequency criteria 114. The light emitter 120 is operable to pulse or strobe light at an emission frequency 120a. The operative emission frequency range of the light emitter 120 may be from 0.1 Hz to 10 kHz but is usually closer to the sampling frequency, e.g., 10-100 Hz.

The light emitter 120 is adjacent the camera 102, even fixed to the camera 102. This ensures that the light emitter and the camera 120 will be aligned relative to the cyclically moving object 150. An angle α defined between the light emitter 120 and the camera 102 should be as small as practicable and within an observation angle of the retro-reflective material 151. However, tests which the Inventors have conducted show that a light emitter 120 in the form of a ring light (https://en.wikipedia.org/wiki/Ring_flash, accessed 2 Sep. 2016) mounted around the lens of the camera 102 provides good results because the angle α is kept small as possible without actually making the light emanate from the camera lens itself.

To render the image capturing system 100 sufficiently portable, it may include a battery or other mobile power source (not illustrated).

Figure 2:
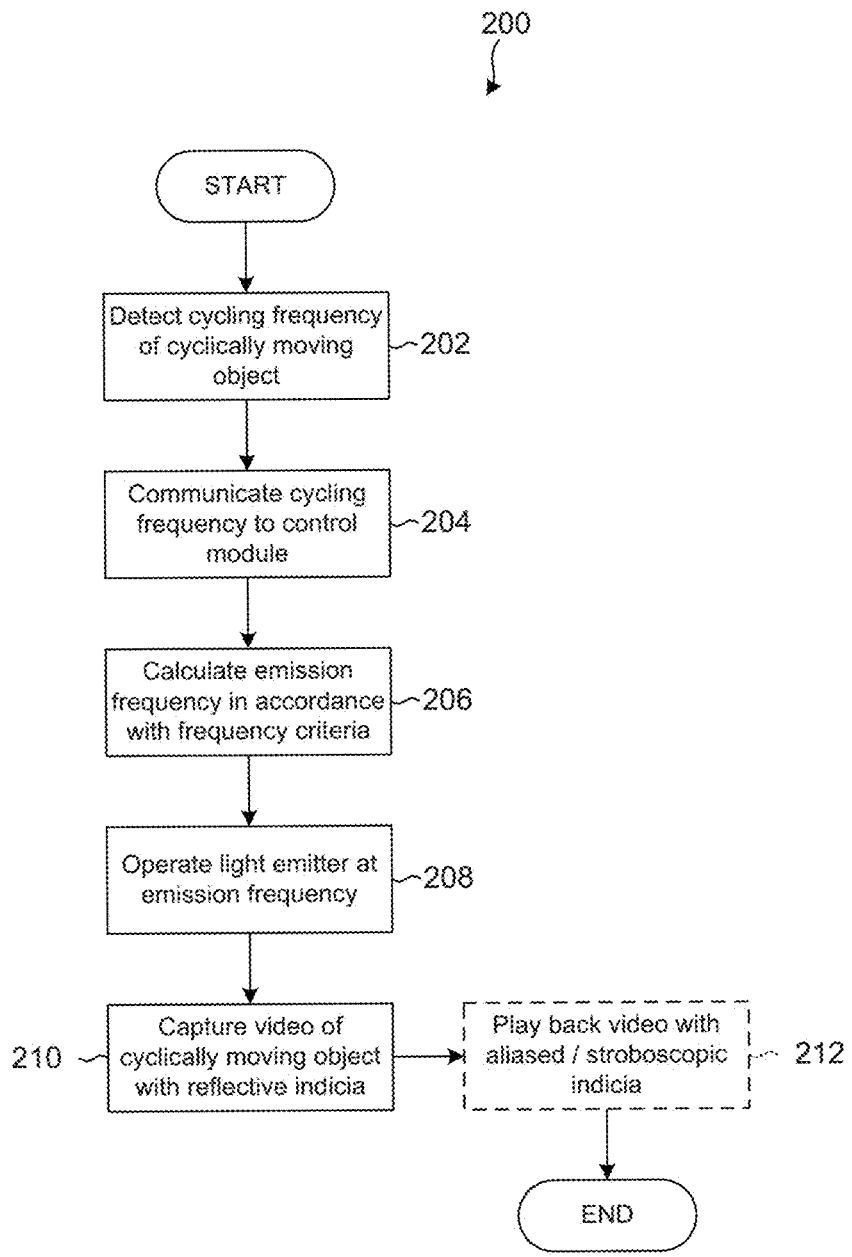
FIG. 2 shows a flow diagram of a method of imaging cyclically moving objects, in accordance with the invention.

FIG. 2 illustrates a method 200 of imaging cyclically moving objects, in accordance with the invention. In this example, the method 200 is described with reference to the image capturing system 100; however, it is to be appreciated that the method 200 may be implemented by a different system (not illustrated) and the image capturing system 100 may be configured to implement a different method (not illustrated).

The bicycle wheel 150 is specially configured prior to implementing the method 200. The retro-reflective indicia 151 is/are placed on the bicycle wheel 150. The indicia 151 may be made using, for example, Scotchlite™ reflective material. The indicia may be for advertising, e.g., configured to show logos, slogans, product information, or they may merely be intended to look visually striking or appealing.

The bicycle wheel 150 is then operated, that is to say, the bicycle is ridden and the bicycle wheel 150 rotates. The sensor 104 is directed towards the bicycle wheel 150 and detects (at block 202) the cycling frequency 150a. A cycle is typically defined as a full revolution, but could be defined as, say, a third of a revolution if the indicia are divided into three rotationally symmetrical sectors. Specifically, in the case of wheels, the cyclically moving object might not actually be the wheel itself but a sector defined by the wheel between spokes of the wheel. Accordingly, a wheel with 10 spokes could define five or 10 cyclically moving objects.

In a basic proof of concept experiment, the Inventors approximated the sensor 104 about 6 m from the bicycle wheel 150 and found it to detect the cycling frequency 150a perfectly accurately.

The sensor 104 generates a frequency reading 104a indicative of the detected cycling frequency 150a which is communicated (at block 204) to the control module 106. The control module 106 in turn calculates (at block 206) the emission frequency 120a in accordance with the frequency criteria 114 (further described below) and generates the control signal 106a indicative of the emission frequency 120a. The control module 106 outputs the control signal 106a to the light emitter 120 thereby to operate the light emitter 120 at the calculated emission frequency 120a.

In the proof of concept experiment, and as mentioned above, the Inventors used a ring light mounted around, but out of the field of view of, a lens of the camera 102. They found that this worked well without the emitted light directly interfering with the captured images—there was no observable peripherally lighting interference.

The camera 102 is then operated as if in a conventional setup and captures (at block 210) a series of images—including the bicycle wheel 150—to constitute a video. The images are composite images comprising the retro-reflective indicia 151 illuminated by the light emitter 120 and any other matter (e.g., the bicycle wheel 150 and background scenery) illuminated by ambient light other than from the light emitter 120.

However, when the video is played back (at block 212) or broadcast and played back at a remote location, the aliasing effect of the indicia 151 is influenced by the flashing light emitted by the light emitter 120 at the emission frequency 120a. That is not to say that there will not be any aliasing effect—it may merely be different to what it would have been had there been no light emitter 120.

In the proof of concept experiment, the Inventors positioned the camera about 6 m away from the bicycle wheel 150 and set the intensity level of the light emitter 120 to a low setting which was sufficient to illuminate the indicia 151 on the bicycle wheel 150. The precise wattage may depend on the light emitter 120 being used, with LED-based light emitters typically requiring lower power input than a gas-filament strobe-based light emitter.

In the proof of concept experiment, the Inventors observed that defining the frequency criteria as the simple rule: emission frequency 106a=cyclic frequency 150a yielded a rotationally stationary display of the indicia 151 (that is, there is no aliasing or the bicycle wheel 150 is stroboscopically neutral).

The Inventors then went further and configured a manually controllable input arrangement (e.g., a dial) to the control module 106. The input arrangement received a user input indicative of a relative adjustment to the emission frequency 120a. In other words, the rule became emission frequency 106a=cyclic frequency 150a±user-defined offset. If the user input was 0 or neutral, the indicia 151 would remain stationary. If the user input was representative of an increase, then the indicia 151 (when replayed in the video) appear to accelerate or start moving forward slowly. Conversely, if the user input represented a decrease, then the indicia 151 (when replayed in the video) appear to decelerate or start moving backwards slowly. The greater the level of user input, the greater the corresponding change. In this manner, the aliasing of the indicia 151 in the video can be influenced and even specifically controlled.

In the experiment, the Inventors noted that it was possible to achieve an emission frequency 120a which was not even observable to the human eye, appearing simply to be a steady light. The Inventors speculate that this would be visually acceptable to bystanders and would not cause visual discomfort. However, the effect on the camera 102 (due to the sampling frequency), and hence on the replayed video, is still noticeable and controllable.

The Inventors noticed that the light emitter 120 functioned in both daylight and artificial (fluorescent) light. Further, the indicia 151 did not blur or morph in the video but showed sharply with appropriate frequency criteria 114. The Inventors believe that the image capturing system 100 can allow the indicia 151 to be displayed clearly in the video (e.g., seen by TV watchers) while allowing the indicia 151 to remain unseen in real life (e.g., not seen by spectators or sporting participants).

By way of development, the Inventors speculate that using multiple types of emitted light (e.g., different colours) could enable multiple images or indicia 151 to be displayed, even animated.

Figure 3:
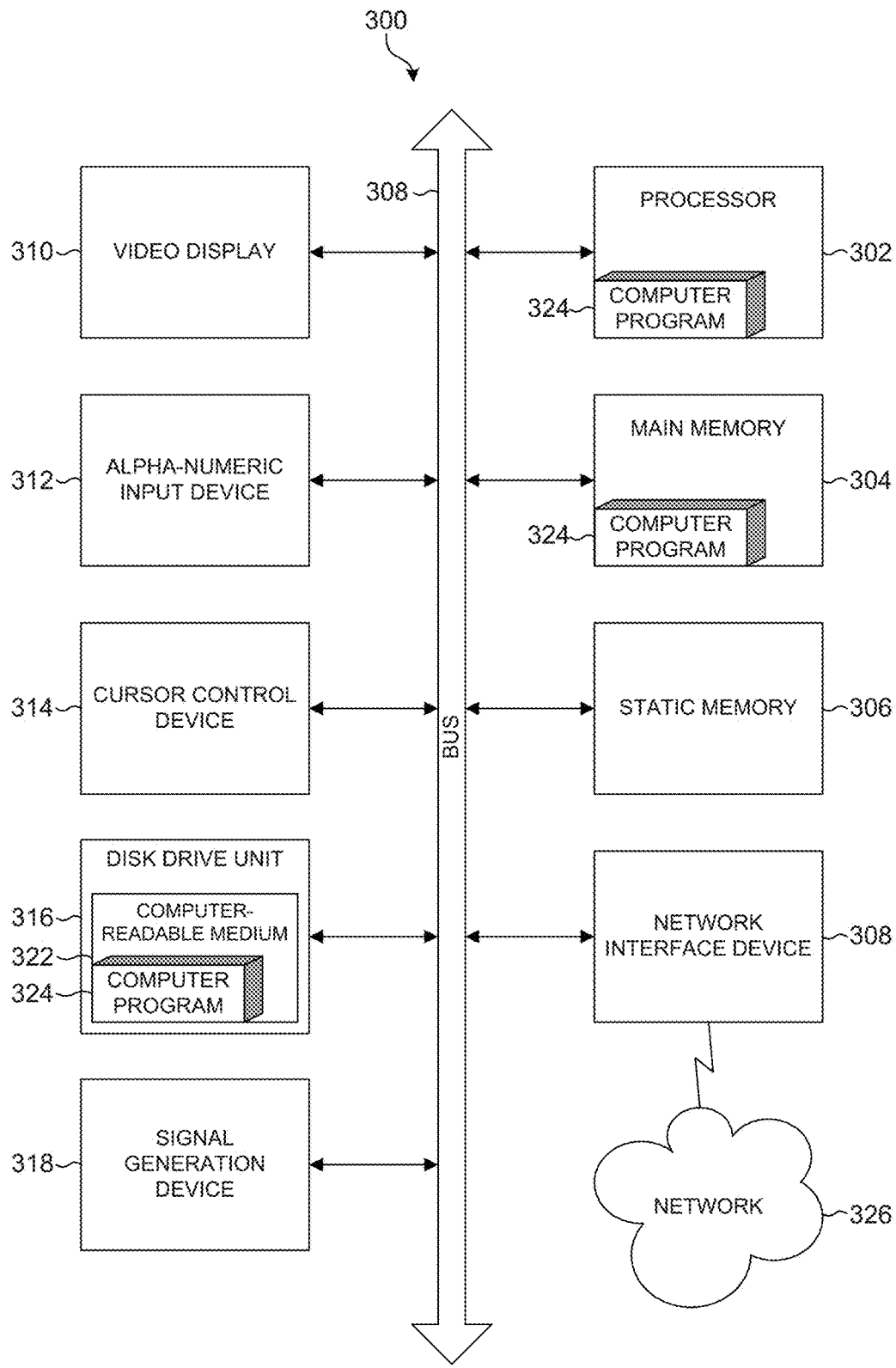
FIG. 3 shows a diagrammatic representation of a computer system within which a computer program, for causing the computer system to perform any one or more of the methodologies discussed herein, may be executed

FIG. 3 shows a diagrammatic representation of a computer system 300 within which a set of instructions, for causing the computer system 300 to perform any one or more of the methodologies described herein, may be executed. In a networked deployment, the computer system 300 may operate in the capacity of a server or a client machine in server-client network environment, or as a peer machine in a peer-to-peer (or distributed) network environment.

The computer system 300 may be a personal computer (PC), a tablet PC, a set-top box (STB), a Personal Digital Assistant (PDA), a cellular telephone, a tablet, a web appliance, a network router, switch or bridge, or any computer system 300 capable of executing a set of instructions (sequential or otherwise) that specify actions to be taken by that computer system 300. Further, while only a single computer system 300 is illustrated, the term "computer" shall also be taken to include any collection of computers that individually or jointly execute a set (or multiple sets) of instructions to perform any one or more of the methodologies discussed herein.

The example computer system 300 includes a computer processor 302 (e.g., a central processing unit (CPU), a graphics processing unit (GPU) or both, a main memory 304 and a static memory 306, which communicate with each other via a bus 308. The computer system 300 may further include a video display unit 310 (e.g., a liquid crystal display (LCD)). The computer system 300 also includes an alphanumeric input device 312 (e.g., a keyboard), a user interface (UI) navigation device 314 (e.g., a mouse or touchscreen), a disk drive unit 316, a signal generation device 318 (e.g., a speaker) and a network interface device 320.

The disk drive unit 316 includes a computer-readable medium 322 on which is stored one or more sets of instructions and data structures (e.g., computer software 324) embodying or utilised by any one or more of the methodologies or functions described herein. The computer software 324 may also reside, completely or at least partially, within the main memory 304 and/or within the processor 302 during execution thereof by the computer system 300, the main memory 304 and the processor 302 also constituting computer-readable media.

The computer software 324 may further be transmitted or received over a network 326 via the network interface device 320 utilizing any one of a number of well-known transfer protocols (e.g., HTTP, FTP).

While the computer-readable medium 322 is shown in an example embodiment to be a single medium, the term "computer-readable medium" should be taken to include a single medium or multiple media (e.g., a centralised or distributed database, and/or associated caches and servers) that store the one or more sets of instructions. The term "computer-readable medium" shall also be taken to include any medium that is capable of storing, encoding or carrying a set of instructions for execution by the computer system 300 and that cause the computer system 300 to perform any one or more of the methodologies of the present embodiments, or that is capable of storing, encoding or carrying data structures utilized by or associated with such a set of instructions. The term "computer-readable medium" shall accordingly be taken to include, but not be limited to, solid-state memories and optical and magnetic media.

The image capturing system 100 may include at least some of the components of the computer system 300.

The invention claimed is:

1. An video capturing system which includes a video camera having a sampling frequency and being operable to capture a series of images to form a video of a cyclically moving object which cycles at a cycling frequency, the sampling and cycling frequencies not necessarily being related, wherein the video capturing system comprises:
    a sensor operable to detect the cycling frequency of the cyclically moving object and to generate a frequency reading indicative of the detected cycling frequency;
    a processor communicably coupled to the sensor and operable to receive from the sensor the frequency reading;
    retro-reflective indicia provided on the cyclically moving object; and
    a light emitter which is aligned with the video camera and is operable to emit pulses of light at a controllable emission frequency, such that pulses of light which reach the retro-reflective indicia are reflected backwards towards the video camera which is operable to capture a composite image comprising the retro-reflective indicia illuminated by the light emitter and any other objects illuminated by ambient light other than from the light emitter, wherein the light emitter is communicatively coupled to the processor which is configured to control the emission frequency of the light emitter based on the frequency reading, thereby to influence the temporal aliasing of the retro-reflective indicia provided on the cyclically moving object as captured in the video.

2. The video capturing system as claimed in claim 1, in which the processor is configured to:
    calculate the emission frequency;
    generate a control signal indicative of the calculated emission frequency; and
    direct the operation of the light emitter by means of the control signal.

3. The video capturing system as claimed in claim 1, which includes a memory module communicatively coupled to, or integrated with, the processor and having stored thereon frequency criteria indicative of how the emission frequency is calculated, the frequency criteria including a sampling frequency of the video camera.

4. The video capturing system as claimed in claim 3, in which the processor, in accordance with the frequency criteria, is operable in one or more of the following ways:
    to match the emission frequency with the cycling frequency;
    to control the emission frequency such that it is not matched to, but is a function of, the cycling frequency;
    to control the emission frequency such that it is a function of both the cycling frequency and the sampling frequency; or
    to control the emission frequency such that it is close to, but not the same as, the sampling frequency.

5. The video capturing system as claimed in claim 1, in which the processor is operable to receive a user input indicative of a desired operational state.

6. The video capturing system as claimed in claim 1, in which:
    the sensor is discreet from the video camera; or
    the sensor is integrated with the video camera.

7. The video capturing system as claimed in claim 1, in which the sensor employs an external telemetry or timing signal.

8. The video capturing system as claimed in claim 1, in which the light emitter is a lens ring light which is mounted or mountable around a lens of the video camera around a longitudinal axis of the video camera lens.

9. The video capturing system as claimed in claim 1, in which the retro-reflective indicia on the cyclically moving object in the video is temporally aliased to display an image or message.

10. The video capturing system as claimed in claim 9, in which the image or message appears stationary or is stroboscopically neutral.

11. A method of imaging cyclically moving objects, wherein the method includes:
    detecting, by a sensor, a cycling frequency of a cyclically moving object and generating, by the sensor, a frequency reading indicative of the detected cycling frequency;
    communicating the frequency reading to a processor which is communicatively coupled to the sensor;
    operating a light emitter to emit pulses of light at a controllable emission frequency and at least in a direction which is aligned with a video camera, the light emitter being communicatively coupled to the processor which is operable to control the emission frequency of the light emitter based on the frequency reading;
    directing the light emitter towards retro-reflective indicia provided on the cyclically moving object, such that pulses of light which reach the retro-reflective indicia are reflected backwards towards the video camera; and
    capturing, by the video camera having a sampling frequency, a series of composite images to form a video of the cyclically moving object, wherein the composite images comprise the retro-reflective indicia illuminated by the light emitter and any other objects illuminated by ambient light other than from the light emitter, thereby to influence the temporal aliasing of the retro-reflective indicia provided on the cyclically moving object as captured in the video.

12. The method as claimed in claim 11 which includes calculating, by the processor, the emission frequency to produce a desired temporal aliasing effect, the calculation of the emission frequency being done by the processor in accordance with frequency criteria stored on a memory module communicatively coupled to the processor.

13. The method as claimed in claim 11, which includes applying the retro-reflective indicia to the cyclically moving object.

14. The method as claimed in claim 11, which is implemented repetitively and continually, that is, continually detecting the cycling frequency and adjusting the emission frequency accordingly.

15. A non-transitory computer-readable medium having stored thereon a computer program which, when executed by a computer processor, causes the processor to perform the method as claimed in claim 11.

* * * * *